US008701447B2

(12) United States Patent
Inoue et al.

(10) Patent No.: US 8,701,447 B2
(45) **Date of Patent: *Apr. 22, 2014**

(54) METHOD OF MANUFACTURING OPTICAL FIBER BASE MATERIAL AND APPARATUS OF THE SAME

(75) Inventors: Dai Inoue, Ibaraki (JP); Hiroyuki Koide, Gunma (JP); Takaaki Nagao, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 524 days.

This patent is subject to a terminal disclaimer.

(21) Appl. No.: 12/341,538

(22) Filed: Dec. 22, 2008

(65) Prior Publication Data

US 2009/0211302 A1 Aug. 27, 2009

Related U.S. Application Data

(63) Continuation-in-part of application No. PCT/JP2007/062809, filed on Jun. 26, 2007.

(30) Foreign Application Priority Data

Jun. 26, 2006 (JP) ................................ 2006-175708
Jun. 21, 2007 (JP) ................................ 2007-164421

(51) Int. Cl.
*C03B 37/12* (2006.01)

(52) U.S. Cl.
USPC .................... 65/507; 65/427; 65/489; 65/379

(58) Field of Classification Search
USPC .................. 65/379, 424, 426, 427, 489, 507; 432/206
See application file for complete search history.

(56) References Cited

U.S. PATENT DOCUMENTS 3,957,476 A * 5/1976 Rau .............................. 65/30.13
4,382,776 A 5/1983 Kawase et al.

(Continued)

FOREIGN PATENT DOCUMENTS

GB 1245027 2/1969
JP 59184734 A * 10/1984

(Continued)

OTHER PUBLICATIONS

Machine translation of Koichi et al. JP2003-165736.*

(Continued)

*Primary Examiner* — Matthew Daniels
*Assistant Examiner* — Lisa Herring
(74) *Attorney, Agent, or Firm* — William J. Kubida; Peter J. Meza; Hogan Lovells US LLP

(57) ABSTRACT

A method of manufacturing an optical fiber base material includes: forming a porous glass base material by depositing glass particles; providing a vessel which employs a composite tube, the composite tube including a portion formed by jacketing a first quartz glass containing aluminum equal to or less than 0.01 ppm with a second quartz glass containing aluminum equal to or more than 15 ppm; introducing dehydration reaction gas and inert gas into the vessel; heating the jacketed portion in the vessel which contains the dehydration reaction gas and the inert gas; and inserting the porous glass base material into the heated vessel to dehydrate and sinter the porous glass base material.

9 Claims, 6 Drawing Sheets

8
10
3
9
4

(56) References Cited

U.S. PATENT DOCUMENTS

| | | | | |
|---|---|---|---|---|
| 5,749,723 | A | 5/1998 | Okase | |
| 6,543,257 | B1 * | 4/2003 | Koaizawa et al. | 65/489 |
| 2003/0221461 | A1 | 12/2003 | Oyamada et al. | |
| 2006/0038695 | A1 * | 2/2006 | Isaacs | 340/688 |

FOREIGN PATENT DOCUMENTS

| | | | | | |
|---|---|---|---|---|---|
| JP | 62-153130 | A | | 7/1987 | |
| JP | 2522829 | B2 | * | 7/1996 | C03B 20/00 |
| JP | 2000219519 | A | * | 8/2000 | |
| JP | 2002-249342 | | | 9/2002 | |
| JP | 2003137584 | A | * | 5/2003 | |
| JP | 2004-002109 | | | 1/2004 | |
| JP | 2006131463 | A | * | 5/2006 | |

OTHER PUBLICATIONS

Machine Translation of JP2000-219519 JPO website Sep. 25, 2012.*

English Translation of JP2003-165736, FLS, Inc. Feb. 2013.*

English translation of Patent No. JP59-184734, translated FLS, Inc., Jun. 2013.*

Machine Translation of Koichi et al. JP2003-165736, JPO website Sep. 14, 2011.*

Chinese Office Action for application No. 200780024249.4 and partial English translation of the same, mailed Dec. 31, 2010, pp. 15.

PCT International Search Report PCT/JP2007062809; Jul. 31, 2007 (In English from Published Application).

* cited by examiner

METHOD OF MANUFACTURING OPTICAL FIBER BASE MATERIAL AND APPARATUS OF THE SAME

CROSS REFERENCE TO RELATED APPLICATION

The present application is a continuation in-part application of PCT/JP2007/062809 filed Jun. 26, 2007, which claims priority from Japanese Patent Application No. 2006-175708 filed Jun. 26, 2006, and from Japanese Patent Application No. 2007-164421 filed Jun. 21, 2007, the contents of which are incorporated herein in their entireties by this reference.

BACKGROUND

1. Technical Field

The present invention relates to a method of manufacturing an optical fiber base material being capable of manufacturing an optical fiber base material of high quality by so-called VAD.

2. Related Art

VAD is well-known as a method of manufacturing base materials for optical fibers. This method employs the following apparatus, for example.

In this apparatus, glass particles produced with a core deposition burner and a cladding deposition burner disposed in a reaction chamber; and the glass particles are deposited onto a tip of a starter mounted on a shaft which rotatably lifts up, so that a porous glass base material for optical fiber made of a core layer and a cladding layer is manufactured. The core layer may be $SiO_2$ with which $GeO_2$ is doped, and the cladding layer may be substantially pure $SiO_2$.

The porous glass base material 1 manufactured as described above is dehydrated and sintered in a heating furnace. The heating furnace has a furnace tube 2 which can be sealed, an electric furnace 3 which heats a part of or the whole of the furnace tube 2, a gas introducing port 4 which introduces any gas into the furnace tube and a gas discharging port 5 which discharges the exhaust gas as shown in FIG. 1, for example. FIGS. 1A to 1C progressively show vitrifying the porous glass base material. Here, reference numeral 6 indicates a shaft which supports the porous glass base material 1.

Dehydrating is performed by heating the base material at approximately 1,100 degrees Celsius in dehydrating gas composed of such as chlorine, oxygen and helium. Meanwhile, vitrifying is performed by heating the base material at approximately 1,500 degrees Celsius in an atmosphere containing such as helium.

For the furnace tube forming a part of the heating furnace, conventionally a silica tube made of natural quartz has been employed as described in Japanese Patent Application Publication No. 2004-002109. For example, the silica tube may be an electric-furnace-melted natural quartz glass tube such as HERALUX-E (trade name), available from Shin-Etsu Quartz Products Co., Ltd., which is made by pulverizing natural quartz and melting in an electric furnace (herein after referred to as a natural quartz glass tube).

When a porous glass base material is dehydrated and sintered by using the natural quartz glass tube as a furnace tube, a resultant optical fiber base material has a problem that the transmission loss increases possibly caused by a little impurity contained in natural quartz. Therefore, the natural quartz furnace tube contains impurities and crystallites, and they nucleate for crystallization. Then, crystallization (into cristobalite) progresses under a high temperature. Particularly, the electric-furnace-melted natural quartz contains aluminum equal to or more than 15 ppm, and the aluminum acts as the core of crystallization. In this case, the impurities diffuse along the crystal grain boundary and are easily discharged into the furnace tube to contaminate the optical fiber base material.

In order to address the above described problem, the inventor proposed that silicide as a raw material is hydrolyzed with oxyhydrogen flame, and a resultant synthetic quartz is used as a furnace tube. Since synthetic quartz contains little impurity and crystallite, crystallization does not progress, so that an advantage of synthetic quartz is that it is much less likely to contaminate the optical fiber base material with any impurity.

An optical fiber base material manufactured by the above described method may be formed as a finished optical fiber base material by adding a cladding to the periphery thereof.

The problem that the transmission loss of the optical fiber base material increases when the natural quartz glass tube is used as the furnace tube can be solved by using the synthetic quartz glass tube in place of the natural quartz glass tube. However, there is another problem that the strength of the synthetic quartz glass tube at a high temperature is less than that of the natural quartz glass tube. For example, since the synthetic quartz furnace tube does not crystallize even if it is used at a high temperature. Therefore, the synthetic quartz furnace tube softens around 1,500 degrees Celsius within processing temperatures, and the furnace tube is deformed because the pressure in the furnace tube is slightly fluctuated around ±3 kPa. This deformation may cause the furnace tube to contact and damage the porous glass base material. Meanwhile, the natural quartz furnace tube easily crystallizes as described above, and the crystallized furnace tube is not easily deformed at a high temperature.

SUMMARY

According to an aspect related to the innovations herein, a method of manufacturing an optical fiber base material that can dehydrate and sinter a porous glass base material without contaminating and damaging the porous glass base material is provided. This object can be achieved by combinations of features recited in dependent claims. In addition, independent claims define further advantageous specific examples.

According to an aspect related to the innovations herein, the method of manufacturing an optical fiber base material includes: forming a porous glass base material by depositing glass particles; providing a vessel which employs a composite tube, the composite tube including a portion formed by jacketing a first quartz glass tube containing aluminum equal to or less than 0.01 ppm with a second quartz glass tube containing aluminum equal to or more than 15 ppm; introducing dehydration reaction gas and inert gas into the vessel; heating the jacketed portion in the vessel which contains the dehydration reaction gas and the inert gas; and inserting the porous glass base material into the heated vessel to dehydrate and sinter the porous glass base material.

According to an aspect related to the innovations herein, an apparatus for dehydrating and sintering a porous glass base material for an optical fiber is provided as an exemplary apparatus for manufacturing an optical fiber base material. The apparatus includes: a furnace tube which employs a composite tube, the composite tube including a portion formed by jacketing a first quartz glass tube containing aluminum equal to or less than 0.01 ppm with a second quartz glass tube containing aluminum equal to or more than 15 ppm, a gas introducing port that introduces gas into the furnace tube; and a gas discharging port that discharges gas from the furnace tube.

The summary clause does not necessarily describe all necessary features of the embodiments of the present invention. The present invention may also be a sub-combination of the features described above.

DESCRIPTION OF EXEMPLARY EMBODIMENTS

Figure 1A:
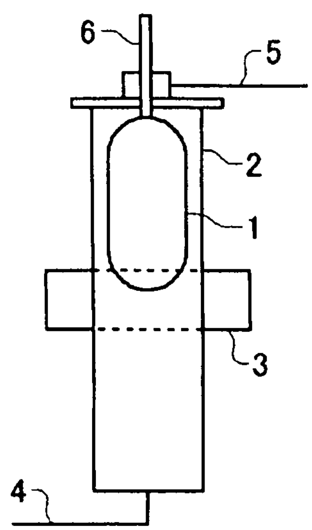
FIGS. 1A-1C are schematic views progressively explaining a step of vitrifying a porous glass base material.
Figure 1B:
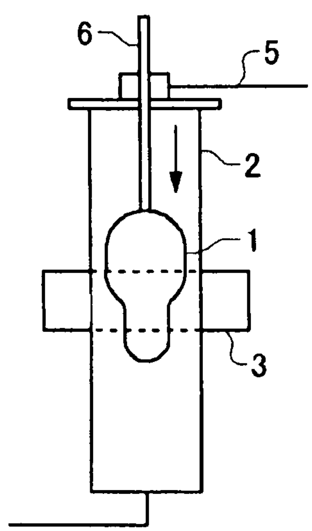
Figure 1C:
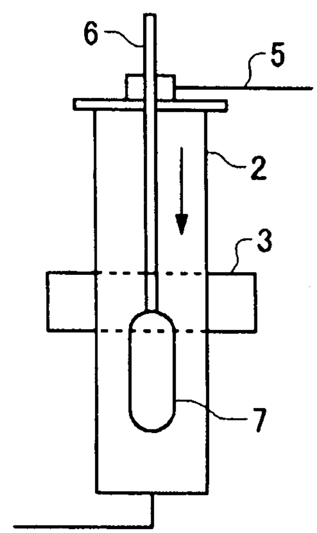

Some aspects of the invention will now be described based on the embodiments, which do not intend to limit the scope of the present invention, but exemplify the invention. All of the features and the combinations thereof described in the embodiment are not necessarily essential to the invention.

The manufacturing apparatus according to the present invention employs a composite tube as a furnace tube (hereinafter referred to as a composite furnace tube), which includes a synthetic quartz glass tube, and a natural quartz glass tube which jackets the synthetic quartz glass tube. When the composite furnace tube is subjected to a high temperature from 1,400 to 1,600 degrees Celsius, the natural quartz part thereof is progressively crystallized (into cristobalite) within 100 to 300 hours, so that the composite furnace tube does not soften in spite of being subjected to a high temperature.

Therefore, even if the synthetic quartz inside the composite furnace tube softens at a high temperature, the composite furnace tube is supported by the crystallized natural quartz outside thereof, so that the composite tube is prevented from being deformed and does not contact to damage the porous glass base material. The synthetic quartz inside the furnace tube does not crystallize and remains glass, so that diffusion of impurities is significantly slow because there is no grain boundary which causes impurities to move. Consequently, there is no problem that the impurities contained in the natural quartz outside the composite furnace tube is discharged into the furnace tube and contaminates the glass base material.

Here, before the porous glass base material is inserted into the vessel, a preheating step is provided for heating the porous glass base material at a high temperature from 1,400 to 1,600 degrees Celsius while a part of the vessel is exposed to the air. Therefore, a part of the natural quartz glass tube crystallizes to improve an effect of preventing deformation. Moreover, it is preferable that aluminum equal to or more than 0.1 wt % is contained in a region of the natural quartz glass tube by 0.1 mm from the outer surface of the outermost layer thereof toward the inner part because crystallization of the natural quartz tube by the preheating step is further promoted. The natural quartz glass tube may be artificially doped with aluminum in depth of 0.1 mm from the outer surface of the outermost layer of the natural quartz glass tube.

After the preheating step ends until inserting the porous glass base material into the vessel, it is preferable that the temperature of the vessel is maintained within a temperature range over which cristobalite is stabilized, particularly, it is preferable to maintain the temperature at 700 degrees Celsius to 1200 degrees Celsius.

The present invention employs a composite tube as a vessel in which a porous glass base material is dehydrated and sintered. The composite tube includes: a synthetic quartz glass tube formed by melting a soot deposit; and a natural quartz glass tube formed by melting natural quartz with an electric furnace, the natural quartz glass tube jacketing the synthetic quartz glass tube. As for the synthetic quartz glass tube forming the inner layer, since crystallization of the natural quartz progresses by a thickness of 1 mm for 1,500 hours, the glass layer remains even if the composite tube is used at a high temperature equal to or more than 1,400 degrees Celsius within a time period obtained by multiplying the thickness of the synthetic quartz tube by 1,500 hours. Therefore, a risk of contaminating the optical fiber base material with impurities can be significantly reduced.

In addition, when the viscosity of the furnace tube decreases by heating, it is likely that the heated portion in the furnace tube is deformed due to a difference in pressure contacts an optical fiber base material during manufacture, the optical fiber base material damages. Therefore, it is preferable to monitor the pressure in the furnace tube and control so as not to result in excess differences between the inside and outside of the furnace tube.

For example, it is preferable that the apparatus includes a pressure control mechanism 11 that controls a pressure in the furnace tube such that the difference in pressure is within a tolerance when the pressure in the furnace tube, or the difference in pressure between the inside or outside of the furnace tube is out of a predetermined tolerance. Specifically, the apparatus for manufacturing an optical fiber base material may include an intra-furnace tube pressure measuring unit 15 that measures a pressure in the furnace tube, and an extra-furnace tube pressure measuring unit 16 that measures a pressure around the heat source 3 outside the furnace tube. In addition, in order to artificially adjust a pressure in the furnace tube, an alarm device 12 may activate when the pressure in the furnace tube, or the difference in pressure between the inside and outside of the furnace tube is out of a predetermined tolerance. Moreover, the exhaust port may be provided with an automatic valve 13 to automatically adjust a flow rate of the valve in order that the pressure in the furnace tube, or the difference in pressure between the inside and outside of the furnace tube be within a predetermined tolerance.

The tolerance of the pressure in the furnace tube may be such as 0 Pa to 1300 Pa. In addition, since a portion adjacent to the furnace would be the highest temperature in the furnace tube and tend to be deformed, it is preferable to employ a pressure in the furnace as a pressure of the extra-furnace tube in order to know the difference in pressure between the inside and outside of the furnace tube. The tolerance of the difference in pressure between the inside and outside of the furnace tube may be such as −200 Pa to 450 Pa.

Moreover, it is considered that the pressure in the furnace tube is fluctuated because of convecting gas in the furnace tube. The diameter of a porous glass base material is reduced by dehydrating and sintering. Therefore, a gap between the base material and the inner wall of the furnace tube is extended so that it facilitates to convect the gas in the furnace tube. The convection preventing plate 14 may be provided for preventing the gas from convecting after the diameter of the base material reduces. It is preferable that the convection preventing plate 14 is provided adjacent to a portion of the shaft on which the porous glass base material is mounted. The diameter of the convection preventing plate 14 may be approximately equal to the diameter of the porous glass base material before being reduced by dehydrating and sintering.

Embodiment 1

A composite tube is manufactured by: forming a soot deposit by hydrolyzing silicide such as $SiCl_4$, $(CH_3)SiCL_3$, $(CH_3)_2SiCL_2$ with oxyhydrogen flame; and jacketing, with a natural quartz tube having a thickness of 4 mm, a synthetic quartz tube having a thickness of 4 mm which is vitrified by melting with a heating furnace. For example, the synthetic quartz tube may be such as SH100 and SH120 (trade name) and the natural quartz tube may be HERALUX-E (trade name), both products are available from Shin-Etsu Quartz Products Co., Ltd.

Figure 2:
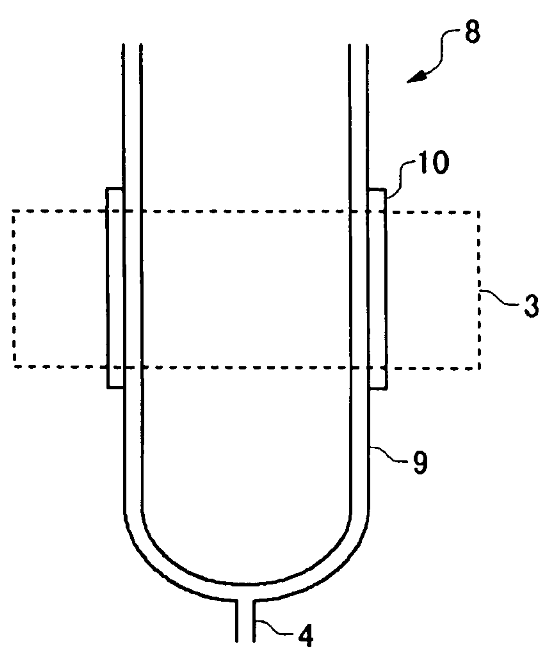
FIG. 2 is a schematic longitudinal sectional view showing an example of composite furnace tube according to the present invention.

As schematically shown in FIG. 2, a composite furnace tube 8 which is formed by jacketing a synthetic quartz glass tube 9 with the natural quartz glass tube 10 sufficiently covers a heating region of an electric furnace 3 as a heat source, and the composite furnace tube 8 is mounted to the heating furnace. Here, the composite tube may be configured as an entire furnace tube, however, when a region to be heated at a high temperature is limited, the composite tube have to cover the heating region but not to cove the other region. Therefore, there is not much point in forming the composite tube as an entire furnace tube but the cost increases.

The manufactured composite furnace tube is preheated at 1,450 degrees Celsius for 7 days while the top of the furnace tube is exposed to the air. By the preheating, the natural quartz part of the composite tube crystallizes to some degree and is strengthened. Therefore, the furnace tube is not easily deformed due to the difference between the inner pressure and the external pressure. Since the crystallized natural quartz does not return to glass, it is enough for a new furnace tube to be preheated only one time, and the preheated furnace tube does not require to be heated any more.

By using the heating furnace having the composite furnace tube, a porous glass base material manufactured by VAD is dehydrated in an atmosphere containing helium, chlorine and oxygen at 1,100 degrees Celsius, and then, is vitrified in an atmosphere containing helium at 1,500 degrees Celsius. During dehydrating and vitrifying, the different between the inner pressure and the external pressure of the heated region of the furnace tube is fluctuated around ±3 kPa, however, deformation of the heated region of the composite furnace tube is not found even if dehydrating and vitrifying is repeated 200 times.

A cladding is added to the periphery of the glass base material obtained by dehydrating and sintering to form an optical fiber base material. The optical fiber base material is drawn to form an optical fiber. As for a resultant optical fiber, increase of the transmission loss is not found differently from one which is manufactured by using the natural quartz furnace tube as described above. Here, the furnace tube is taken out upon exceeding 6,000 hours over which the furnace tube is subjected to a high temperature equal to or more than 1,400 degrees Celsius, and the heated portion is examined. The result is that the glass layer is totally eliminated and entirely crystallized in a large part.

Comparative Example 1

Figure 3:
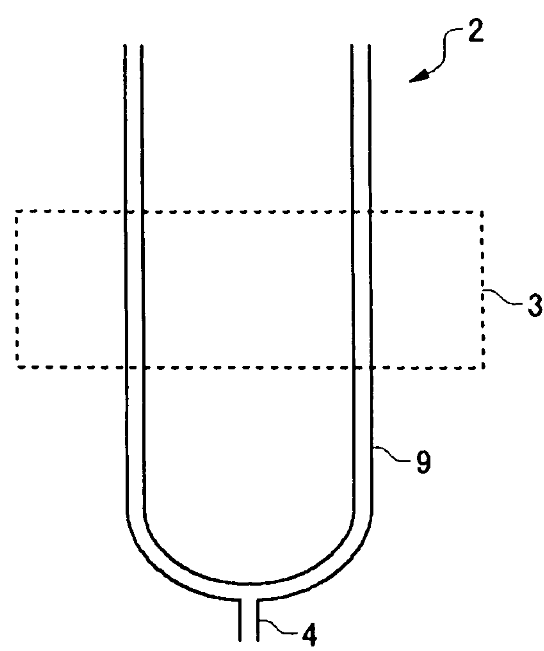
FIG. 3 is a schematic longitudinal sectional view showing a synthetic quartz furnace tube.
Figure 4:
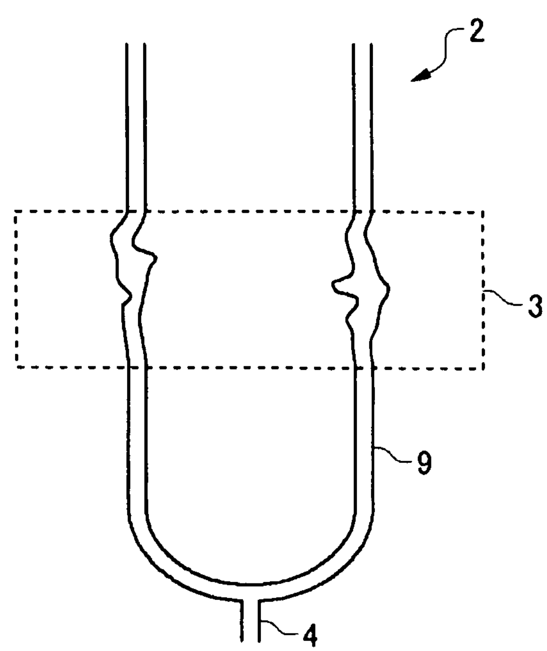
FIG. 4 is a schematic longitudinal sectional view showing a deformed synthetic quartz furnace tube.
Figure 5:
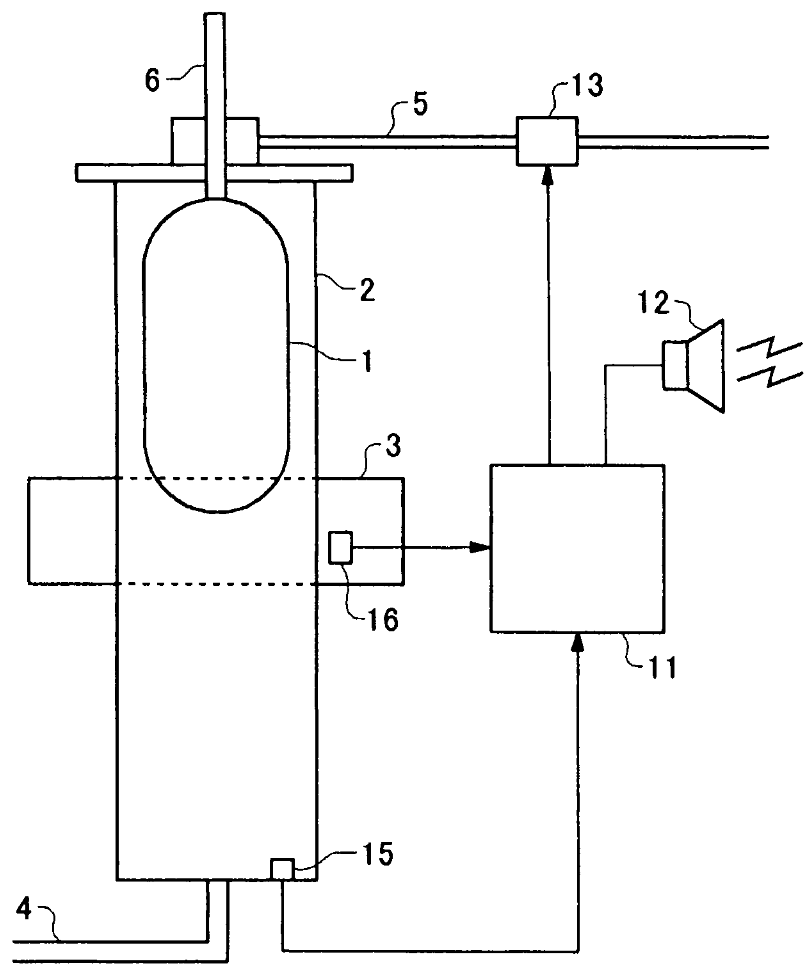
FIG. 5 shows an apparatus for manufacturing an optical fiber base material.
Figure 6:
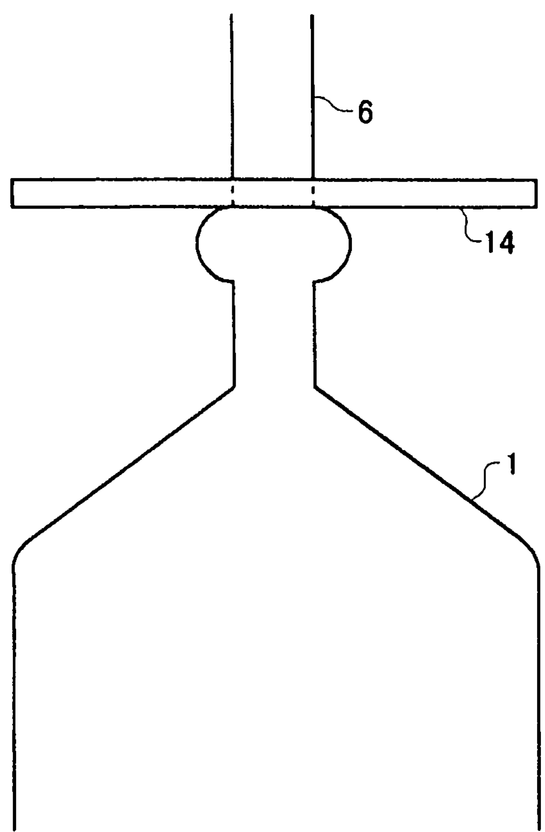
FIG. 6 shows an exemplary convection preventing plate mounted on a shaft for supporting a glass base material.

By using the heating furnace having the synthetic quartz glass tube 9 as shown in FIG. 3 as a furnace tube 2, the porous glass base material is dehydrated and sintered. At the 20th time of dehydrating and sintering a porous glass base material under a condition the same as Embodiment 1, deformation of the heating region of the furnace tube as FIG. 4. is found. The deformed portion of the furnace tube contacts the porous glass base material around the 30th time.

The manufacturing method and the manufacturing apparatus according to the present invention may be provided in another embodiment as follows. That is, in a method of manufacturing an optical fiber base material and an apparatus of the same, the synthetic quartz glass of the composite tube contains metal impurities less than those in the natural quartz glass of the composite tube. It is preferable that the content of aluminum of the synthetic quartz glass is equal to or less than one-tenth of metal impurities of the natural quartz glass. In addition, it is preferable that the synthetic quartz glass of the composite tube remains a glass state, and at least a part of the natural quartz glass of the composite tube is crystallized in the method of manufacturing an optical fiber base material and an apparatus of the same.

While the embodiments of the present invention have been described, the technical scope of the invention is not limited to the above described embodiments. It is apparent to persons skilled in the art that various alternations and improvements can be added to the above-described embodiments. It is also apparent from the scope of the claims that the embodiments added with such alternations or improvements can be included in the technical scope of the invention. The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

According to the present invention, a composite tube is used as a furnace tube, which includes a synthetic quartz glass tube, and a natural quartz glass tube which jackets the synthetic quartz glass tube. Therefore, impurities derived from furnace tube materials are not discharged in the furnace tube, and do not contaminate the optical fiber base material. The composite furnace tube does not soften within processing temperatures and not fluctuate due to a little pressure fluctuation. Consequently, the composite furnace tube can dehydrate and sinter the porous glass base material without contacting and damaging the porous glass base material. Thus, a high-quality optical fiber base material can be constantly obtained.

What is claimed is:

1. An apparatus for dehydrating and sintering a porous glass base material for an optical fiber, comprising:

a furnace tube which employs a composite tube, the composite tube including a portion formed by jacketing a first quartz glass tube containing aluminum equal to or less than 0.01 ppm with a second quartz glass tube containing aluminum equal to or more than 15 ppm;

a gas introducing port that introduces gas into the furnace tube;

a gas discharging port that discharges gas from the furnace tube; and a convection preventing plate that is mounted adjacent to a porous glass base material mounting part of a shaft for supporting the porous glass base material, the convection preventing plate having a diameter approximately equal to a diameter of the porous glass base material before being reduced by dehydrating and sintering, wherein the first quartz glass tube which contains aluminum equal to or less than 0.01 ppm includes a synthetic quartz, and the second quartz glass tube is crystallized by preheating.

2. The apparatus according to claim 1, wherein the second quartz glass tube which contains aluminum equal to or more than 15 ppm includes a natural quartz.

3. The apparatus according to claim 1, wherein the synthetic quartz is made from any of $SiCl_4$, $(CH_3)SiCl_3$, $(CH_3)_2SiCl_2$ or a mixed compound thereof.

4. The apparatus according to claim 1, wherein the jacketed portion is larger than an area heated by the heating.

5. The apparatus according to claim 1, further comprising:

an intra-furnace tube pressure measuring unit that measures a pressure in the furnace tube; and a pressure control mechanism that adjusts a pressure in the furnace tube.

6. The apparatus according to claim 5, wherein the pressure control mechanism includes an alarm unit that alerts when the pressure measured by the intra-furnace tube pressure measuring unit is out of a predetermined range.

7. The apparatus according to claim 5, wherein the pressure control mechanism includes:

an automatic valve provided on the gas discharging port; and a control unit that controls a flow rate of the automatic valve in order that the pressure measured by the intra-furnace tube pressure measuring unit be within a predetermined range.

8. The apparatus according to claim 5, further comprising an extra-furnace tube pressure measuring unit that measures a pressure around a heat source outside the furnace tube, wherein the pressure control mechanism includes an alarm unit that alerts when a difference between the pressure measured by the intra-furnace tube pressure measuring unit and the pressure measured by the extra-furnace tube pressure measuring unit is out of a predetermined range.

9. The apparatus according to claim 5, further comprising an extra-furnace tube pressure measuring unit that measures a pressure around a heat source outside the furnace tube, wherein the pressure control mechanism includes:

an automatic valve provided on the gas discharging port; and a control unit that controls a flow rate of the automatic valve in order that a difference between the pressure measured by the intra-furnace tube pressure measuring unit and the pressure measured by the extra-furnace tube pressure measuring unit be within a predetermined range.

* * * * *